Sept. 16, 1952  G. D. NULL ET AL  2,610,863
TRACTOR HITCH
Filed Aug. 30, 1950
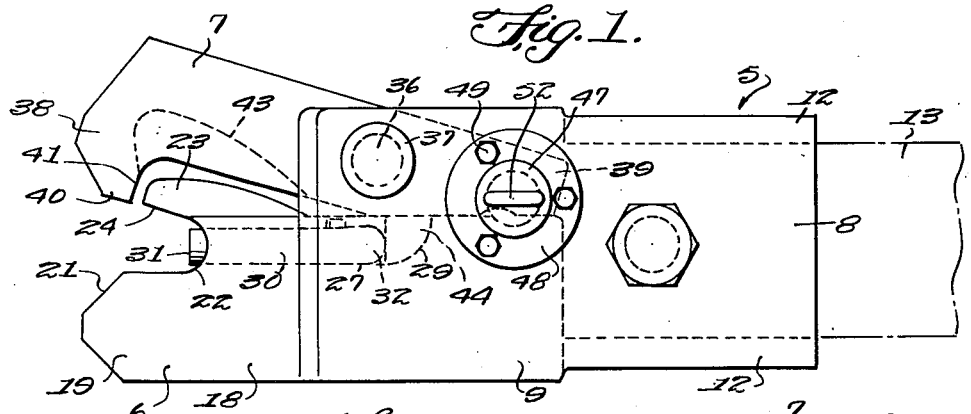
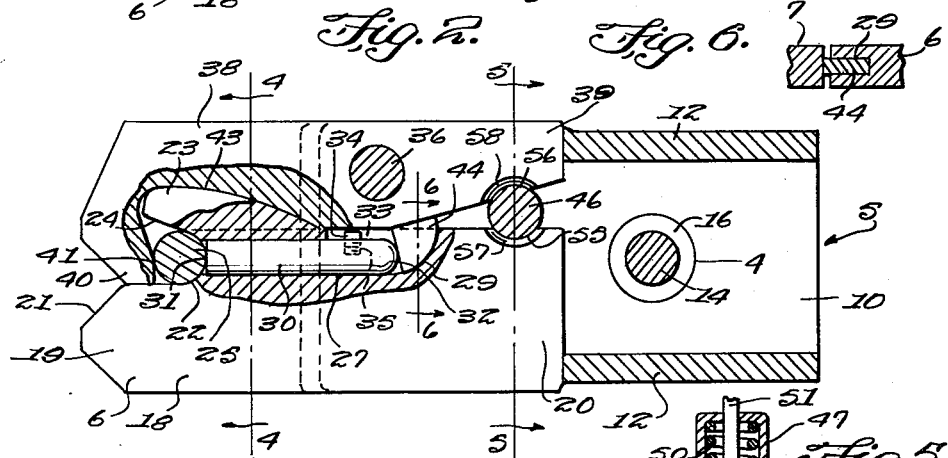
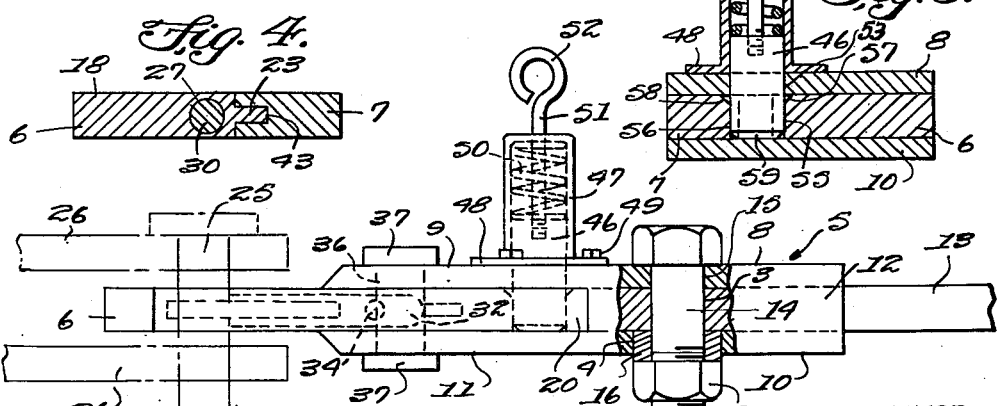
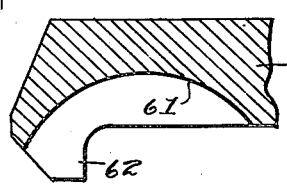
INVENTOR.
George D. Null,
Clifton E. Zepp,
BY Victor J. Evans & Co.
ATTORNEYS Patented Sept. 16, 1952

2,610,863

UNITED STATES PATENT OFFICE 2,610,863

TRACTOR HITCH

George D. Null and Clifton E. Zepp, Taneytown, Md.

Application August 30, 1950, Serial No. 182,348

2 Claims. (Cl. 280—33.15)

The present invention relates to improvements in a tractor hitch, and more particularly to a tractor hitch for releasably coupling a motor vehicle tractor unit in draft relationship with trailers, farm implement frames and the like.

One object is to provide a tractor hitch which is adapted to be installed on the draft bar of a motor vehicle tractor unit having a pair of cooperating jaw members which can be conveniently released from their locked position by the operator of the tractor unit to uncouple the tractor from draft relationship with a trailer or farm implement frame.

Another object is to provide a tractor hitch having fixed and movable cooperating jaw members which are adapted to be closed by an actuator when the king pin on the trailer unit or implement frame is moved between said cooperating jaw members by backing the tractor unit in a direction toward the trailer or implement frame coupling pin.

Another object is to provide a tractor hitch having a movable and fixed set of cooperating jaw members which are adapted to be locked in an operative position by means of a locking pin yieldingly urged between the jaw members to positively lock the same in a closed position.

Another object is to provide a tractor hitch in which the cooperating movable and fixed jaw members are automatically locked in a closed position by the releasable locking pin after the coupling or king pin on the trailer or implement frame has been fully received between the jaw members when the same are in their open position.

Another object is to provide a tractor hitch in which the fixed jaw member is provided with a guide member which projects rearwardly and laterally for guiding the coupling pin of the trailer or implement frame in position between the cooperating jaw members, and to provide a recess in the movable jaw member for receiving said projection when the jaw members are in their closed position.

Another object is to provide a tractor hitch having a movable jaw member which is adapted to be closed by means of a coupling pin engaging actuator slide movably mounted in the fixed jaw and arranged to close the movable jaw when the actuator slide is engaged by a coupling or king pin.

Other objects and advantages of the invention will become apparent during the course of the following description of the accompanying drawing wherein:

Figure 1 is a top elevational view of the tractor hitch showing the cooperating jaw members in their open position.

Figure 2 is a longitudinal cross sectional view showing portions thereof broken away to illustrate the relative positions of the various parts when the jaw members are in their closed position.

Figure 3 is a side elevational view of the tractor hitch showing the manner in which the same is connected to the draft bar of a tractor unit with the cooperating jaw members in releasable locking engagement with the coupling pin of a trailer unit or farm implement frame.

Figure 4 is a transverse cross sectional view taken on line 4—4 of Figure 2 and looking in the direction of the arrows to illustrate the manner in which the guide projection is received in a correspondingly shaped recess in the movable jaw member.

Figure 5 is a transverse cross sectional view taken on line 5—5 of Figure 2 illustrating the manner in which the releasable locking pin is yieldingly urged into a position to lock the jaw members in a closed position.

Figure 6 is a transverse cross sectional view taken on line 6—6 of Figure 2 and looking in the direction of the arrows to illustrate a segment positioned to be actuated by the movable member for engaging the longitudinally movable coupling pin engaging actuator slide.

Figure 7 is a detail illustrating a modification wherein the movable jaw is provided with a milled slot.

In the drawing, and more in detail, there is shown for the purpose of convenience of illustration a trailer hitch including a body portion generally designated 5 having a fixed jaw 6 and a movable jaw 7 likewise generally designated. The body portion 5 includes a box-like structure which may be formed of a casting or if desired, may be fabricated from suitable plates welded or otherwise secured together. The body portion 5 includes a top plate 8 having a slightly widened end portion 9 and a lower plate 10, also having a widened portion 11. The smaller ends of the plates 8 and 10 are connected by side plates 12 which extend a portion of the length of the upper and lower plates 8 and 10, and terminate adjacent the widened portions 9 and 11 to provide a space therebetween for receiving the jaw members 7 and 6.

Thus, a box-like structure is formed on one end of the body 5 which may be received on the draft bar 13 of a tractor motor vehicle unit (not shown) of conventional design. A transverse locking bolt 14 extends through alined openings 15 and 4 in the upper and lower plates 8 and 10 and passes through a correspondingly positioned opening 3 in the draft bar 13. The locking bolt 14 is provided with a washer or the like 16 that is positioned in the opening 4 and being clamped against the draft bar 13 by a nut 2 provides means for locking the parts in assembled relation on the draw bar.

The fixed jaw 6 is received between the upper and lower plates 8 and 9 and is welded or otherwies secured between the enlarged portions 9 and 11 thereof. The fixed jaw 6 includes a plate-like member 18 having a reduced front end portion 19 and a rear portion 20 of slightly increased width. The reduced portion 19 is provided with an inclined or beveled front end 21 forming the mouth of a king pin receiving slot 22. Formed integral with the fixed jaw member 6 is a laterally and rearwardly extending projection 23, the inner edge of which is shaped to provide a guide surface 24 adapted to correctly guide a coupling or king pin 25 into proper position. The king pin 25 is carried on the draft bars 26 of a trailer or implement frame (not shown) except for a small portion thereof as shown in Fig. 3.

Formed in the fixed jaw member 6 is a longitudinal bore 27 which opens into the slot 22 at one end and has its opposite end opening into a slot 29. Reciprocably mounted in the bore 27 is a king pin engaging actuator pin 30 having a flat outer end 31 positioned to be engaged by a king pin and an arcuate inner end 32 positioned to engage a segment 44 in the slot 29 at the inner end of the bore 27. Also opening into the bore 27 from one edge of the fixed jaw 6 is a slot 33 for receiving a guide pin 34, which has one end threaded for being received in a correspondingly threaded bore 35 in the actuator slide pin 30. Thus, longitudinal movement of the actuator slide pin 30 is limited by the stop pin 34 in such a manner that the actuator slide pin will not be displaced.

The movable jaw member 7 is likewise received between the widened portions of the plates 8 and 10 as at 9 and 11, and is pivoted therebetween by means of a pivot pin 36 having enlarged head portions 37 at its opposite ends to prevent displacement. The pivoted jaw member 7 includes a hooked end portion 38 and a tail portion 39, and said hooked end 38 is provided with a projection 40 which is adapted to cooperate with the slot 22 to retain the coupling or king pin 25 in position. The projection 40 provides a king pin engaging wall 41 which is adapted to overlie the slot 22 when the jaw members are in their closed positions to retain the coupling pin against displacement.

The hooked end portion 38 is provided with a curved recess 43 for receiving the projection 23, and said recess extends from the inner edge of the movable jaw member 7 a sufficient distance to receive said projection. The recess being correspondingly shaped such that the projection 23 will slide freely therein when the jaw member 7 is closed.

The recess 43, as shown in Figure 2, is shaped so that it is cast or molded in the jaw, and in the design shown in Figure 7, a jaw 60 similar to the jaw 7 is provided with an arcuate recess 61 that is formed so that it may be milled in the inner surface of the jaw. The jaw, in this design, is provided with a hooklike projection 62 similar to the projection 40 of the jaw 7.

The segment 44 is positioned to be engaged by one end of the slide actuator pin 30 such that when a coupling pin 25 is received in the slot 22, said pin 30 will be engaged thereby which will urge the jaw member 7 to its closed position.

In order to lock the movable jaw member 7 in a closed position, a locking pin 46 is slidably mounted in a cylindrical housing 47 which has a flanged end 48 affixed to the portion 9 of the top plate 8 by machine screws or the like 49. The locking pin 46 is yieldingly urged downwardly by means of a coil spring 50 mounted in the cylindrical housing 47, and is adapted to be retracted by means of a pull rod 51 which has its lower end threaded in a correspondingly threaded opening in the locking pin 46 and its upper end provided with an eye 52 for receiving a flexible operating cable adapted to be manually operated by the driver or operator of the tractor. The locking pin 46 is arranged to project through an opening 53 in the plate 8 and to be received between the tail portions 20 and 39 of the jaws 6 and 7.

The tail portions 20 and 39 of the jaw members 6 and 7 are notched as at 55 and 56 respectively for receiving the locking pin 46 to hold the jaw members in a closed position, and the upper edges of said notches 55 and 56 are beveled as at 57 and 58 respectively to permit the beveled lower end portion 59 of the pin 46 to be projected between the tail portions of the jaws under the influence of the coil spring 50, and after the coupling pin 25 has moved into the slot 22 into engagement with the actuator pin 30 to thereby close the movable jaw member 7.

When it is desired to release the coupling pin 25, the locking pin 46 is moved upwardly then as the tractor is moved forward the coupling pin 25 will pull against the king pin engaging wall 41 of the projection 40. This motion causes the tail portion 39 of the movable jaw member 7 to swing inwardly, since the pin 46 has been removed the jaw 7 will pivot on the pivot pin 33 to an open position. As the tail portion 39 of the movable jaw 7 swings inwardly to engagement the segment 44 which initiates movement of the coupling pin 25 from the slot 22 by reason of the segment 44 engaging the actuator pin 30. When coupling the vehicles, the tractor is moved rearwardly so that the coupling pin 25 will enter the slot formed by the surfaces 22 and 24 of the jaw 6 and projection 23. As the coupling pin moves into the slot it engages one end of the actuator slide 30, which causes the opposite end to engage the segment 44 and swing the hooked end 38 of the movable jaw member into the slot 22. As this occurs, the tail portion 39 of the movable jaw member 7 separates from the tail portion 20 of the fixed jaw member 6, and the locking pin 46 is yieldingly projected therebetween where it is received between the notches 55 and 56 in the respective tail portions 20 and 39.

We claim:

1. In a tractor hitch for coupling a tractor in draft relation with trailers, farm implements and the like having a coupling pin, a support carried by said tractor, cooperating jaw members on said support for receiving said coupling pin, one of said jaw members being fixed and provided with a coupling pin receiving opening, a projection on said fixed jaw member forming with said opening a slot for receiving said coupling pin, the other of said jaw members being pivoted to the support and provided with a hooked end adapted to close said slot, a longitudinally extending bore in said fixed jaw communicating at one end with said slot and at the other end with an open sided slot in said fixed jaw, a segment positioned in said open sided slot a sliding actuator carried by the bore in the fixed jaw and having one end projecting into said slot and adapted to be engaged by a coupling pin entering said slot and its other end in engagement with the segment which is positioned to engage the pivoted jaw member, and a spring pressed locking bolt carried by the support adapted to be yieldingly urged between the tail portions of said jaw members to hold the same in a closed position.

2. In a tractor hitch for coupling a tractor in draft relation with trailers, farm implements and the like having a coupling pin, a box-like support carried by the draft bar of said tractor having spaced apart upper and lower jaw supporting plates, a fixed jaw welded in place between said plates having a coupling pin receiving opening and a projection forming a coupling pin receiving slot with said opening, a pivoted jaw mounted between said plates having a hooked end for closing said slot and a recess corresponding in shape to said projection for receiving the same, a longitudinally extending bore in said fixed jaw communicating at one end with said slot and at the other end with an open sided slot in said fixed jaw, a segment positioned in said open sided slot, an actuator pin slidably mounted in the bore in the fixed jaw and having one end projecting into said slot and its opposite end arranged in abutting relation with the segment which is positioned to actuate said pivoted jaw to closed position, and a spring pressed locking bolt adapted to be received between the tail portions of said jaws.

GEORGE D. NULL.
CLIFTON E. ZEPP.

REFERENCES CITED

The following references are of record in the file of this patent:

UNITED STATES PATENTS

| Number | Name | Date |
|---|---|---|
| 844,522 | Johnson | Feb. 19, 1907 |
| 1,491,637 | Schrum | Apr. 22, 1924 |
| 2,245,270 | Goode | June 10, 1941 |
| 2,491,373 | Goff | Dec. 13, 1949 |